US007881984B2

(12) United States Patent
Kane, Jr. et al.

(10) Patent No.: US 7,881,984 B2
(45) Date of Patent: Feb. 1, 2011

(54) SERVICE FOR PROVIDING ITEM RECOMMENDATIONS

(75) Inventors: Francis J. Kane, Jr., Sammamish, WA (US); Brent R. Smith, Redmond, WA (US); Jocelyn M. Miller, Seattle, WA (US); ShenbagaKumaran Srinivasan, Issaquah, WA (US); Matthew T. Tavis, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 473 days.

(21) Appl. No.: 11/694,758

(22) Filed: Mar. 30, 2007

(65) Prior Publication Data
US 2008/0243632 A1    Oct. 2, 2008

(51) Int. Cl.
G06Q 30/00    (2006.01)
(52) U.S. Cl. .................................................... 705/26.7
(58) Field of Classification Search ............... 705/26, 705/27
See application file for complete search history.

(56) References Cited

U.S. PATENT DOCUMENTS

| | | | |
|---|---|---|---|
| 6,006,225 A | 12/1999 | Bowman et al. | |
| 6,356,879 B2* | 3/2002 | Aggarwal et al. | 705/26 |
| 6,772,150 B1 | 8/2004 | Whitman et al. | |
| 6,865,546 B1* | 3/2005 | Song | 705/26 |
| 6,912,505 B2 | 6/2005 | Linden et al. | |
| 6,981,040 B1 | 12/2005 | Konig et al. | |
| 7,114,170 B2 | 9/2006 | Harris et al. | |
| 7,152,061 B2 | 12/2006 | Curtis et al. | |
| 7,412,442 B1 | 8/2008 | Vadon et al. | |
| 7,565,425 B2 | 7/2009 | Van Vleet et al. | |
| 7,590,562 B2* | 9/2009 | Stoppelman | 705/26 |
| 2002/0019763 A1* | 2/2002 | Linden et al. | 705/10 |
| 2004/0103186 A1 | 5/2004 | Casati et al. | |
| 2005/0038819 A1 | 2/2005 | Hicken et al. | |
| 2006/0106665 A1 | 5/2006 | Kumar et al. | |
| 2006/0206510 A1* | 9/2006 | Moulhaud et al. | 707/101 |
| 2007/0005437 A1* | 1/2007 | Stoppelman | 705/26 |

OTHER PUBLICATIONS

U.S. Appl. No. 10/864,288, filed Jun. 9, 2004 (application text, drawings, and filing receipt provided).

(Continued)

*Primary Examiner*—Amee A Shah
*Assistant Examiner*—Brandy Zukanovich
(74) *Attorney, Agent, or Firm*—Knobbe, Martens, Olson & Bear, LLP

(57) ABSTRACT

A service is disclosed for enabling web sites and other entities to provide item recommendations and other behavior-based content to end users. The service can be implemented as a web service that is remotely accessible over the Internet. Web sites use the web service's interface to report events descriptive of item-related actions performed by end users (e.g., item views, item purchases, searches for items, etc.). The web service analyzes the reported event data on an aggregated basis to detect various types of associations between particular items, and stores resulting datasets that map items to associated items. The web service's interface also provides various API calls for enabling the web sites to request item recommendations and other behavior-based content, including but not limited to personalized recommendations that are based on the event history of the target user. Advantageously, the web sites need not host the infrastructure for providing such content.

26 Claims, 6 Drawing Sheets

OTHER PUBLICATIONS

Press release titled "Aggregate Knowledge Delivers Relevance and Increases Revenue for Retail and Media Sites," dated Mar. 7, 2006.

Press release titled "Aggregate Knowledge Unveils the Internet's First Discovery Service," dated Jan. 30, 2007.

Ibrahim Cingil, et al., "A Broader Approach to Personalization," Communications of the ACM, vol. 43, No. 8, dated Aug. 2000, pp. 136-141.

Article titled "The Great Giveaway," by Erick Schonfeld, in Business 2.0 Magazine dated Apr. 1, 2005.

Notification of concurrently-filed applications in one page.

Blog posting titled "Loomia: a product-recommendation Web service," Alpha Blog, Alpha.cnet.com, dated Jul. 10, 2006, posted by Andrew Gruen, printed from http://reviews.cnet.com/4531-10921_7-6550327.html.

International Search Report and Written Opinion in counterpart PCT application PCT/US 08/58516.

Schafer et al., "E-Commerce Recommendation Applications," Data Mining and Knowledge Discovery, vol. 5, Nos. 1-2, Jan. 2001, pp. 115-153.

* cited by examiner

SERVICE FOR PROVIDING ITEM RECOMMENDATIONS

TECHNICAL FIELD

The present disclosure relates to computer-implemented services for detecting behavior-based associations between items, and for generating item recommendations.

BACKGROUND

Relatively large and sophisticated web sites typically implement some form of personalization system to provide personalized content, such as personalized item recommendations, to their users. The personalization system typically monitors and records one or more types of item-related user activity such as item purchases, item viewing events, and/or item rentals, and analyzes the collected data to detect and quantify associations between particular items. When a user accesses a particular item, such as a particular product in a catalog of an e-commerce site, or an article on a news site, an appropriate message may be displayed notifying the user of related items (e.g., "people who bought this item also bought . . . ," or "people who viewed this item also viewed . . . "). The personalization system may also generate personalized item recommendations that are based on a target user's purchase history, item viewing history, item ratings, and/or some other type of user data.

Unfortunately, personalization systems tend to be expensive to implement and maintain. For example, a relatively sophisticated personalization system typically requires infrastructure components which, among other tasks, store customer behavior data, process the stored behavior data to detect the item associations, and store databases which relate items to one another. As a result, among other reasons, sophisticated personalization systems are typically available only to relatively large companies.

SUMMARY

A service is disclosed for enabling web sites and other entities to provide item recommendations and other user-behavior-based content to end users. The service can be implemented, for example, as a web service that is remotely accessible over the Internet. Web sites use the web service's interface to report events descriptive of item-related actions performed by end users (e.g., item views, item purchases, searches for items, etc.). The web service analyzes the reported event data on an aggregated basis to detect various types of user-behavior-based associations between particular items, and stores resulting datasets that map items to associated items. The web service's interface also provides various API calls for enabling the web sites to request item recommendations and other behavior-based content, including but not limited to personalized recommendations that are based on the event history of the target user. Advantageously, the web sites need not host the infrastructure for providing such content.

Neither this summary nor the following detailed description purports to define the invention. The invention is defined by the claims.

DETAILED DESCRIPTION OF SPECIFIC EMBODIMENTS

I. Overview

Embodiments of the present disclosure comprise a computer system and service for enabling operators of interactive computer systems (e.g., web sites) to provide behavior-based content, such as personalized item recommendations, to their users without having to provide the infrastructure for generating such content. In some embodiments, the service is implemented as a web service that is accessible over a public network such as the Internet. For purposes of illustration, the web service will be described in the context of web sites that use the web service to generate or select content to present to web site users. As will be recognized, however, web sites are merely one type of interactive computer system that can use the web service. Other examples include interactive television systems, online services networks, in-store kiosks, and systems that provide recommendations to users by email.

The web sites typically host electronic catalogs or repositories of items that are available for purchase, rent, download, subscription, viewing, and/or some other form of consumption. Examples include retailer web sites, music and video download sites, online travel reservation sites, news sites, auction sites, shopping portals, dating sites, social networking sites and sites that provide a combination of these functions. The web sites may use the web service to perform a variety of services, including but not limited to the following: (a) storing and maintaining user-specific event histories, such as item purchase histories, item viewing histories, item rental histories, and/or search histories, (b) analyzing these event histories to detect various types of associations between specific items, (c) generating personalized item recommendations for users, (d) generating "conditional probability" data, such as "5% of the users who made a purchase after viewing item A purchased item B," which may be displayed on item detail pages, (e) generating and returning lists of the most popular items based on various metrics. The web service may advantageously provide these and other services without having any information (other than item identifiers, and possibly item types) about the particular items involved.

Figure 1:
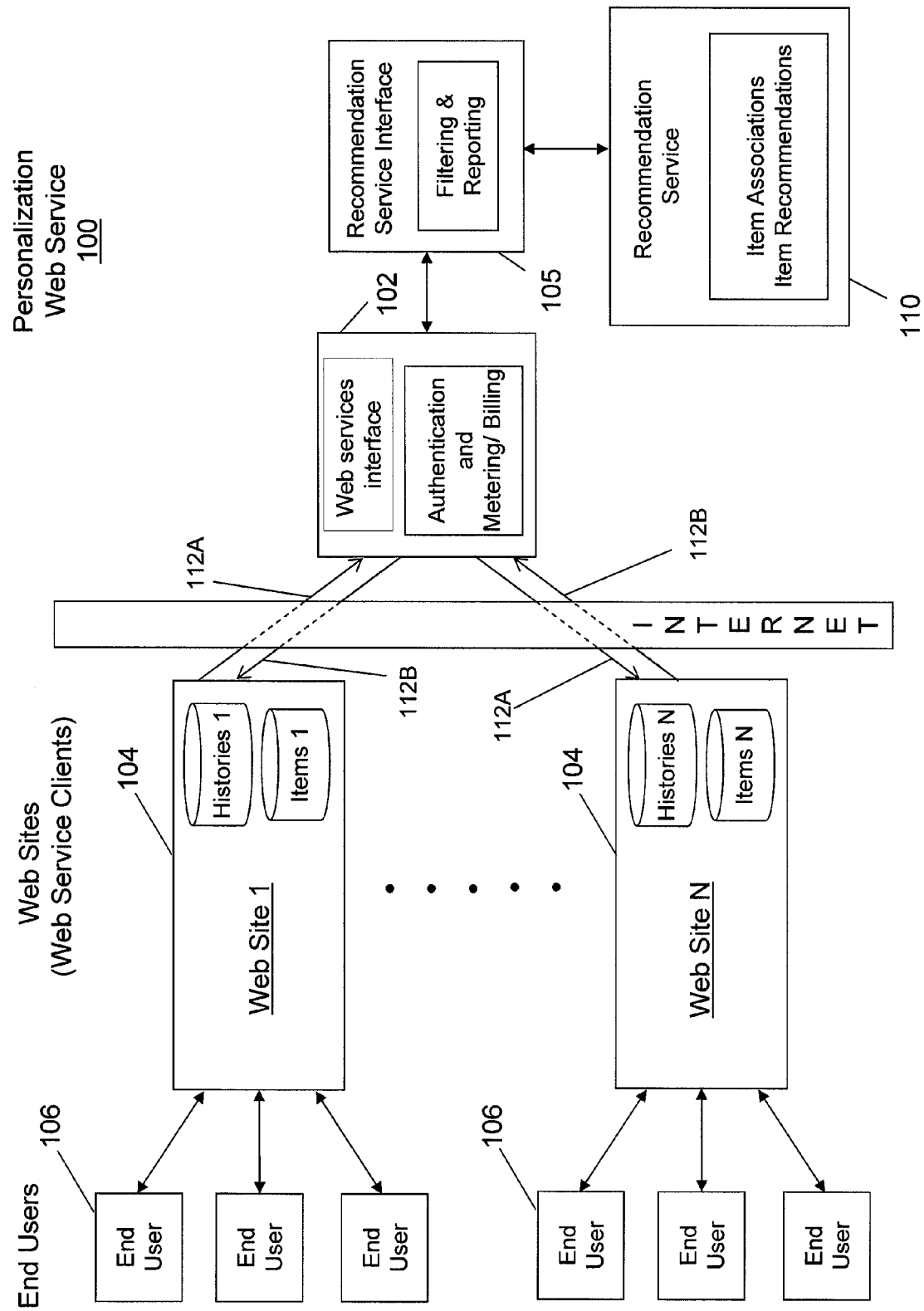
FIG. 1 schematically illustrates one embodiment of a personalization web service in communication with external web sites.

FIG. 1 illustrates one embodiment of the web service 100. The web service 100 comprises a combination of hardware and software for interacting with web sites 104 (and/or other types of clients of the web service) over the Internet. Each web site 104 comprises one or more physical servers or other computing devices (not shown) for receiving and responding to page requests received from browsers/computing devices of end users 106. In some instances, an end user 106 may be an automated agent or "bot" that emulates an actual user, or may be a group of individuals who share a computer.

The web sites 104 act as clients of the web service, and are thus referred to herein as "web service clients." The operators of these web sites 104, and of other types of web service clients, are referred to generally as "web service users." For purposes of discussion, it will be assumed (except where specified otherwise) that each web service client 104 corresponds uniquely to a particular web service user.

The web sites 104 may be operated or provided by different business entities from one another, and by entities other than the operator/provider of the web service 100. In general, the end users 106 visit the web sites 104 and access electronic catalogs or repositories of items hosted by the web sites 104. As end users 106 perform specific types of item-related events (e.g., item purchases, item downloads, item rentals, item viewing events, etc.), the web sites 104 report these events to the web service 100 via application programming interface (API) calls. The web service persistently stores these events (i.e., data descriptive of the events) in association with an identifier of the end user 106, and in association with the web service client or web site 104 that reported the event. Each web site operator can decide which events and event types to report to the web service. The web service 100 also can include an API for receiving bulk uploads of event data. This feature is particularly useful for new web service users, as it allows them to immediately supply the web service 100 with a sufficient quantity of (previously collected) event data for generating meaningful item associations.

For each web site 104, the web service 100 collectively analyzes the event histories of the web site's end users 106 to detect and quantify associations between specific items. For example, the web service may analyze the purchase histories of a given web site's end users to generate a dataset of purchase-based item associations, and may analyze the item viewing histories of these users to generate a dataset of view-based item associations. The web service typically stores these item association datasets separately for each web site 104, and uses these datasets to respond to data requests from the web sites 104.

The data requests may include, for example, requests for lists of items that are related to a particular source item, and requests for personalized recommendations for a particular user. (Both of these types of item content are referred to herein generally as "recommendations"). According to some embodiments, the data requests are generated by the web sites 104 in response to page requests from end users 106. The web service's responses to these requests may be embodied in specific or general purpose languages, such as, among other languages, extensible markup language (XML). The requesting web site 104 typically parses the response, and uses the response to retrieve or generate HTML or other content for displaying the recommendations within the requested web page. For example, the requesting web site may translate an XML-based list of recommended items into an HTML sequence that displays descriptions of these items.

As depicted in FIG. 1, the requests 112A from the web sites 104 are received by a web services interface 102, which can, in some embodiments, perform authentication and/or metering/billing. According to some embodiments, for example, web service users can be billed for requests and/or for the storage of user data. In one embodiment, web service users are charged only for data requests from the web service 100, not for requests to store event data, or vice-versa. The web service interface 102 communicates the received requests 112A to a recommendation service 110 through a recommendation service interface 105. Although not shown in FIG. 1, the recommendation service 110 may itself comprise multiple distinct services, such as a data service that stores the reported event data, an association or "similarities" service that detects and stores data regarding item associations, and a personalized-recommendations service that uses information retrieved from the data and association services to generate personalized recommendations for specific end users 106. Item recommendations returned by the recommendation service may be filtered by the recommendation service interface 105 before being returned to the requesting web site 104, as described below.

The web service 100 may also be capable of using the reported event data to generate lists of the most popular items. Separate lists may be generated for different types of items, and for different types of events (e.g., views versus purchases). These lists may be made available via an API.

Advantageously, the personalization web service 100 may be tailored for use with any suitable web site 104 (or other type of system) and is not limited to any specific type of web site 104. Examples include, but are not limited to, electronic retailers, newspapers, content aggregators, redirectors, social networks, and search engines. The web service 100 enables the web sites 104 to provide item recommendations and other forms of behavior-based content to their users. For example, an end user 106 viewing a pair of shoes on a merchant's web site 104 might receive a recommendation for shoe laces or shoes with similar designs. Similarly, end users 104 viewing a news web site for information on a local festival might receive a recommendation for articles written about other local festivals. These recommendations in turn may encourage end users 106 to spend more time using the web sites 104 and conducting associated transactions.

Advantageously, the item recommendations are generated by the web service 100, and not by the web sites 104 themselves. As a result, the web service users may provide valuable recommendations and personalized content to their end users 106 without the need to develop and maintain their own personalization systems. This allows web service users to focus on their core online operations, such as their item catalogs, rather than personalization implementation. These and other objects and advantages of the present disclosure are discussed in greater detail below.

Figure 2A:
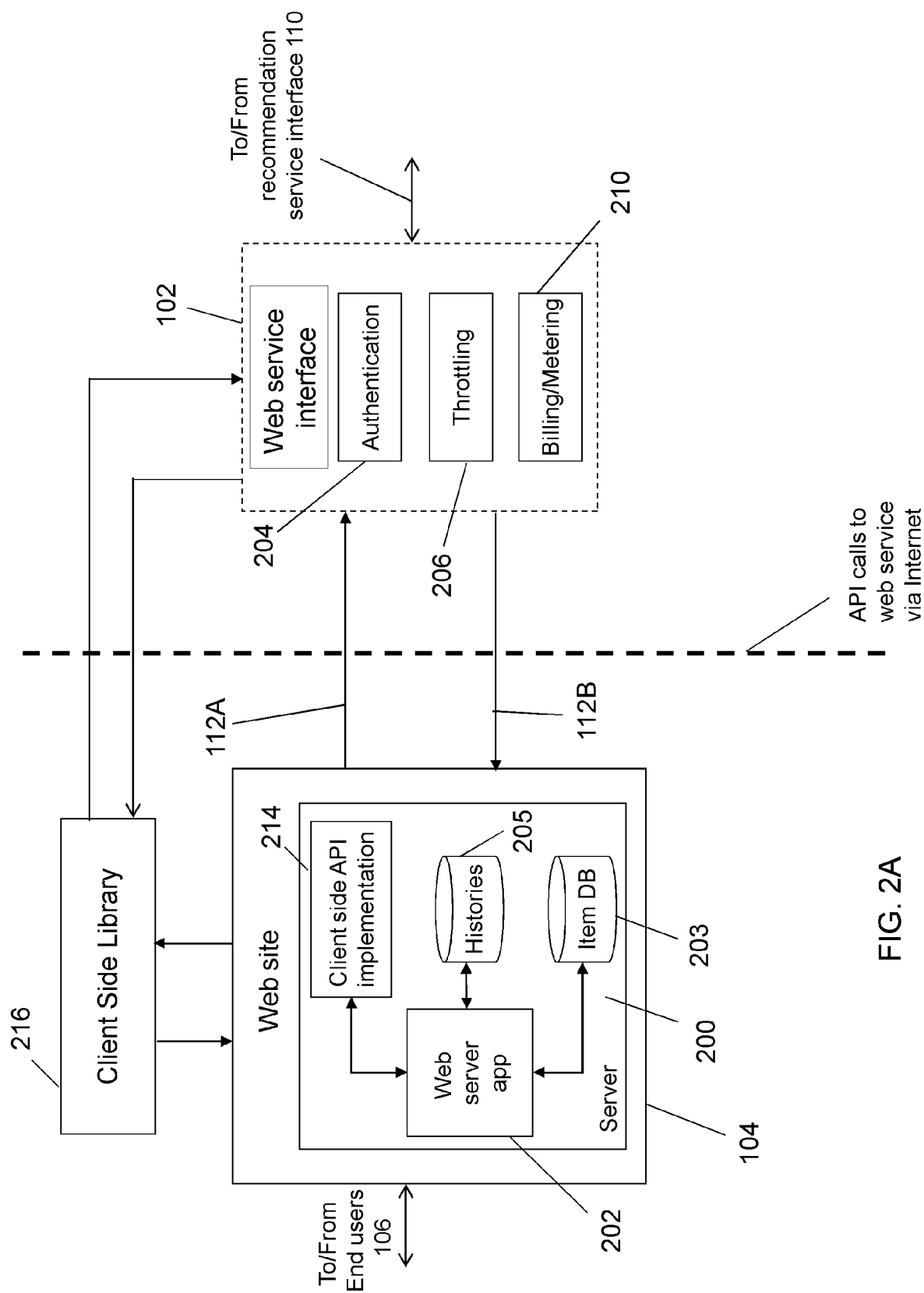
FIG. 2A schematically illustrates embodiments of a web site and a web service interface of the personalization web service of FIG. 1.

FIG. 2A illustrates a typical configuration of a web site 104 that may use the web service 100. The web site 104 comprises a web server 200 that utilizes a web server application 202 (e.g. Apache web server) to generate and serve pages of the web site 104 to the computing devices of the end users 106. (The term "end user" is used herein to refer generally to both the end users themselves and to the computing devices of such users.) The web server 200 provides the end users 106 with access to an electronic repository 203 of items, such as an electronic catalog of items. (The term "item" is used interchangeably and collectively to refer to an actual item, such as a physical product, and a representation of that item in a computer.)

The items may, for example, comprise items which may be purchased via the web site 104. Examples include, but are not limited to, books, music and video titles in physical or downloadable form, consumer electronics products, household appliances, and magazines and other subscriptions. Other examples include articles, web sites, web pages, event tickets, DVDs available for rent, browse nodes, video clips, television shows, restaurants, web logs ("blogs"), users of a dating or social networking website, postings by users, and advertisements. The items may, but need not, be arranged within a hierarchy of browse categories or browse nodes.

Typically but not necessarily, the end users 106 can obtain detailed information about each item by accessing the item's detail page within the web site's electronic catalog. The detail pages may be located, for example, by conducting a search for the item or by selecting the item from a browse tree listing. An item detail page may, for example, provide an option for the end user 106 to purchase, rent, or bid on the corresponding item. The web server 200 may generate the item detail pages, and other pages of the web site, dynamically using web page templates (not shown). User accesses to item detail pages may be reported to the web service 100 as item viewing events. In a typical application, the web site 104 might also be configured to use the web service 100 to dynamically supply lists of related items for incorporation into the item detail pages. When a web site 104 receives such a list from the web service 100, it may retrieve the catalog content of the associated items from its own databases, and present such content to the end user 106.

As illustrated in FIG. 2A, the web site 104 may optionally maintain a data repository 205 of user event data or "histories." For example, the web site 104 may maintain the purchase, rental, or item download history of each of its customers. Typically, however, the web site offloads the task of storing at least some types of events to the web service 100. The types of user-generated events that may be reported to and recorded by the web service 100 may include, for example, viewing items, purchasing items, renting items, downloading items, placing items in a virtual shopping cart, returning items, rating items, submitting comments on items, and keyword searches. Supplementary information regarding each such event may also be reported, such the type of the event, an identifier of the user (which may be a session ID if the user is unknown or unrecognized), and an identifier of the item.

As further illustrated in FIG. 2A, the web service interface 102 may include executable components for handling authentication, throttling 206, and billing/metering 210. Authentication is the process of verifying that requests received by the web service 100 are from authorized web service clients. Throttling refers to the process of regulating the number of requests made by a given web site user per unit time. Billing/metering refers to the process of billing web service users for use of the web service 100.

As discussed above, requests 112A may be made by the web sites 104 to the personalization web service for item recommendations. These requests are made in accordance with an interface description which specifies how information is transmitted between the web site 104 and the web service. In one embodiment, this description is provided by an Application Programming Interface (API) implementation for accessing the personalization web service, as discussed below.

In one embodiment, a web services description language (WSDL) file is used to specify the API. In general, WSDL describes the web locations at which the personalization web service may be accessed (e.g. URLs, ports) as well as a list of valid operations which can be performed and the structure for generating input requests 112A and interpreting output responses 112B. Additional detail regarding WSDL is available in the "Web Services Description Language (WSDL) Version 2.0 Part 1: Core Language, W3C Working Draft 10 May 2005" document, dated May 10, 2005 and in the "Web Services Description Language (WSDL) Version 2.0 Part 2: Adjuncts, W3C Candidate Recommendation 27 Mar. 2006" document available at http://www.w3.org/TR/wsdl20-adjuncts/, each of which is incorporated herein by reference in its entirety.

Figure 2B:
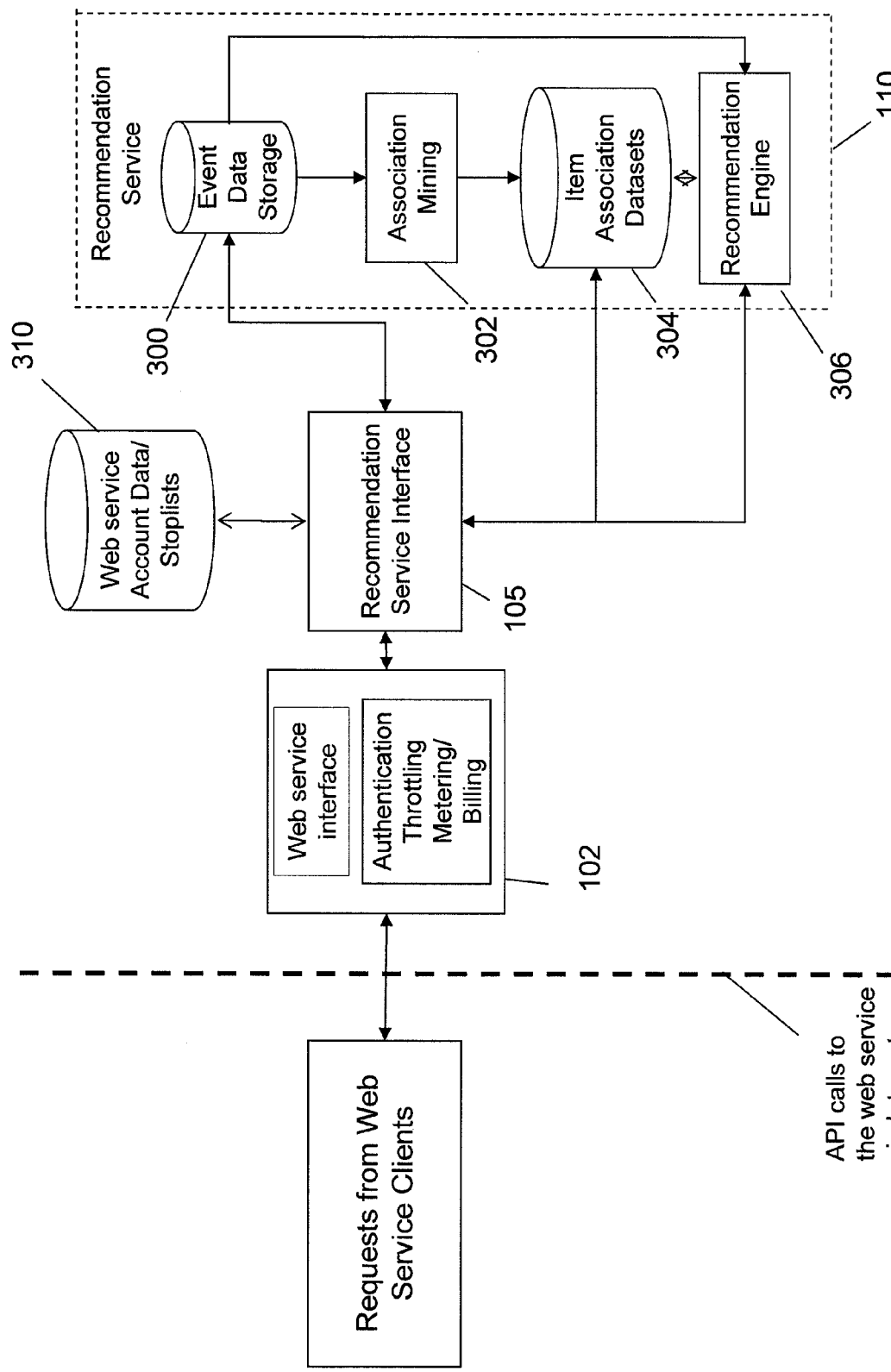
FIG. 2B illustrates one embodiment of the personalization web service of FIG. 1, highlighting the structure and communication of the recommendation service interface and the recommendation service.

FIG. 2B illustrates the primary components of the web service 100. As illustrated, requests received by the web services interface 102, including both data requests and requests to store event data, are passed to the recommendation service interface 105. One function performed by the recommendation service interface 105 is stoplisting, which enables web service users to efficiently block certain items from being recommended. Stoplisting is described further below. The recommendation service interface 105 may also handle certain reporting tasks.

As illustrated in FIG. 2B, requests to store event data are passed to an event data repository 300. Although shown as part of the recommendation service 110, a separate data service may be provided for storing the event data. Each reported event is ordinarily stored in association with the following: the web service client that reported the event, the end user 106 that generated the event, an identifier of the type of the event (e.g., purchase, view, rent, etc.), an item/item type identifier, and an event timestamp. The event timestamps may be used to purge "old" event data as needed, with different types of events optionally being retained for longer time periods than others. In one embodiment, the event histories repository is implemented as an Oracle database in combination with a cache.

The event data collected for a particular web site 104 (or possibly for a group of web sites operated by a common entity) is analyzed periodically by an association mining component 302 to detect and quantify associations between the web site's items. As discussed below, item association datasets or tables may be generated for different types of events. For example, a dataset of purchase-based item associations may be generated based on stored purchase event data, and a separate dataset of viewing-based item associations may be generated based on stored viewing event data. The association mining algorithms may optionally use event timestamps to accord greater weight to more recent events, such that the detected associations strongly reflect current item preferences of users. Examples of association mining methods that may be used are described in the following patent references, the disclosures of which are hereby incorporated by reference in their entirety: U.S. Pat. Nos. 6,912,505, 7,113,917 and 6,185,558; U.S. application Ser. No. 10/766,368, filed Jan. 28, 2004; and U.S. application Ser. No. 10/864,288, filed Jun. 9, 2004.

The events that are reported to and analyzed by the web service may include search events in which an end user 106 submits a search query (typically a text string containing one or more search terms) to a web site's search engine. For such events, the search query may be treated as the "item." In this regard, search events histories may be analyzed in substantially the same way as event histories in which the events correspond to particular catalog items. By including search events in the analysis, datasets can be generated that, e.g., map specific search queries to other types of items (e.g., articles or products), or that map search queries to related search queries. These datasets may, for example, be used by a particular web site 104 (via appropriate API calls) to, e.g., suggest catalog items that are related to one or more search queries submitted by a user, or to suggest alternative search queries that are related to a search query submitted by a user.

The results of the association analyses are stored in an item association database or repository 304. These results may take the form of item association datasets or mappings, which may be stored in data structures such as tables. In a preferred embodiment, the item association data comprises item-to-item mappings. Each mapping may generally be in the form of items determined to be the most closely related to a reference item. Different datasets may also be stored for different types of events. For example, one dataset may indicate those items that have been viewed the most frequently by those who have viewed specific items. Another dataset may indicate those items that have been purchased the most frequently by users who have viewed specific items. Yet another dataset may map specific search queries to the items most commonly purchased (or viewed, rented, etc.) by those who submit the search query. The various item-to-item mappings may optionally be stored together with scores indicative of the calculated degrees of association between the items, and may be accessible via an associations or "similarities" service as discussed above.

With further reference to FIG. 2B, a recommendation engine 306 uses the item association datasets, in combination with item activity data stored for a particular user, to generate personalized recommendations for that user. The recommendations may, for example, be generated as described in the U.S. patents referenced above.

As depicted by the arrow connecting the item associations repository 304 to the recommendation service interface 105, some data requests can be serviced directly from the item associations database 304, without invoking the recommendations engine 306. This is the case where the request is merely a request for a list of items that are related to a specified item. Although these requests do not invoke the recommendation engine 306, the returned items are referred to herein as recommended items or "recommendations" since they are typically suggested to a user.

Additional details of the recommendation service 110 are set forth in the sections that follow.

II. Example API Parameters

An example set of parameters that may be included in web service requests 112A are described below. These parameters are illustrative, and may be varied significantly without departing from the scope of the invention.

User ID—a unique identifier for the end user 106. The user IDs reported by a given web service client to the web service 100 need not be the actual user IDs used by the web service client. For example, an appropriate encryption or ID transformation algorithm may be used to protect user privacy.

As another example, a given web site 104 can use a single user ID to report the events of a group or class of end users 106, such as all users falling in a particular geographic location. For instance, when a particular end user 106 initiates an event, the web site 104 could report the event twice—once in association with the user ID of the end user, and once in associate with the user ID of a group to which the end user belongs. The events reported at the group level can be used for various purposes, such as to obtain group-level recommendations, or to identify the items that are the most popular within a particular group.

Item ID—a unique identifier provided to the personalization web service by a web service client. The Item IDs may, but need not, be the same as those ordinarily used by the web service client, provided that each Item ID remains constant throughout the use of the personalization web service. Advantageously, a given web site/web service client may mask the "true" Item IDs to protect the privacy of the end users. This may be accomplished using an appropriate encryption algorithm or other ID transformation function. Item IDs need not be unique across web service users or clients; e.g., two different web service users can use the same Item ID to identify different items. In addition, as discussed below, Item IDs need not be unique across item types.

Item Type—an identifier of a type of an item. In one embodiment, both an Item ID and an Item Type are required to uniquely identify an item. Examples of item types that may be supported by the system include the following: Product, Browse Node, Advertisement, Article, AudioDownload, Bundle, Car, Comment, Document, Flight, Group, Hotel, Listing, Person, Post, Restaurant, Review, Service, VideoDownload, SearchQuery, WebSite, Journal, Poll, Deal. As with the Event Types, the web service may use a list of valid Item Types. When an invalid Item Type is provided to the personalization web service, the web service may return a message with a list of valid Item Types and an explanation of how to request a new Item Type. In one embodiment, requests to add new Item Types may be evaluated manually and accepted or rejected by the operator of the personalization web service.

The use of Item Types enables the web service clients to request recommendations that are specific to a particular Item Type. This may be useful in scenarios where the web service user wishes to recommend items of a particular type. In other embodiments, Item Types may be omitted, and the Item ID alone may uniquely identify each item.

Event Type—a verb which describes the action an end user 106 has taken in connection with an item. Event types may include, but are not limited to, viewing an item, purchasing an item, renting an item, downloading an item, placing an item in an electronic shopping cart, returning an item, submitting a comment on an item, e-mailing an item listing, and using an item as a search query. Additional examples of Event Types are discussed in greater detail in the examples below in Section VIII ("Example Use Cases"). When a web service client reports an event to the web service 100, the web service client typically communicates to the web service the Event Type, the Item ID, the Item Type, the User ID of the user who generated the event, and an event timestamp (see Event Time, discussed below).

As described below, the web service 100 preferably uses Event Type information to detect different types of item associations. Specifically, by segregating and analyzing events of a particular type, the web service can generate, and supply the web service client with, item associations that are specific to that Event Type (e.g., "users who purchase A also purchase B," "Users who view C also view D," or "Users who rent E also rent F"). The web service 100 may also collectively analyze events of two different types to generate association data such as "users who view A purchase B," or "X % of the users who make a purchase after viewing C purchase D."

The web service 100 may use a list of valid event types to validate requests 112A from web service clients. If an invalid Event Type is supplied in a request 112A, the web service may return a runtime error message with a list of valid Event Types and an explanation of how to request a new Event Type. Requests to add new Event Types may be evaluated manually by the operator of the personalization web service.

The list of valid Event Types may be dynamic, as discussed in greater detail below with respect to FIG. 2B. Advantageously, the web service user does not have to rebuild the code on its web site 104 to take advantage of new features. Furthermore, the operator of the personalization web service need not support an unreasonably large number of WSDL versions.

Event Time—the time of occurrence of the event. In one embodiment, the event time is represented as the number of seconds since epoch. The personalization web service may allow dates in the future. Event times may be used by the web service in various ways, such as to give greater weight to more recent events than to older events.

Item List—a list of Item IDs and associated Item Types, as both are required in the preferred embodiment to uniquely identify an item. In one embodiment, the Item List is a list of items from which recommendations are derived by the recommendation service, as discussed in greater detail below. It should be noted that the Item List is not the list of recommendations. In one example, the Item List may comprise the items which are present in the end user's shopping cart and the recommendations would be based upon those items.

Application ID—a security code which, in certain embodiments, is incorporated into requests 112A submitted to the personalization web service 100. As discussed in greater detail below, the Application ID comprises a combination of the Web Service Access Key ID, the Application Name (see below), and whether the personalization web service is operating in a test environment. The Application ID is written dynamically as requests are submitted to the personalization web service.

In one embodiment, the following additional parameters are common to all operation requests.

Web Service Access Key ID—An identifier of a web service user or web service client.

Time Stamp—The date and time at which a request 112A is submitted.

Signature—A hash of at least a portion of the request parameters in order to authenticate the requester. In one embodiment, the signature comprises a hash of the time stamp and the operation name, with the Access Key ID used as a seed to the hashing algorithm. In some embodiments, most or all types of API calls may require a valid signature.

Version—The version of the API which a client web site is using.

Application Name—A string that the web service user may use to subdivide its personalization space. For example, if a web service user operates multiple web sites that are clients of the web service, the Application Name may be used to distinguish between these web sites 104. In this scenario, the web service user could alternatively use the same application name for two or more of these web sites, in which case these web sites would be treated as a single web service client.

The following additional elements may be used for all operation responses:

HTTP Headers—An echo of the HTTP headers sent with the request.

Arguments—An echo of name-value pairs, including all arguments, even those not understood by the personalization web service.

Request ID—A unique identifier assigned to each request submitted to the personalization web service.

Request—An echo of the request parameters for the operation which is invoked in the request 112A sent by the web site 104. In one embodiment, the Request parameter may comprise only the arguments understood by the service.

Errors—A summary of errors in the request parameters or runtime issues. In one embodiment, each Error contains a code and a message. An Error is used when the request is not processed to completion.

Warnings—A summary of warnings. In one embodiment, each Warning contains a code and a message. A Warning is used when there are exceptions to the request 112A sent by the web site 104 but that the operation is still completed.

III. API Operations

Examples of the types of operations which may be invoked by requests 112A from the web service clients 104 are discussed below. These operations are illustrative, and may be varied without departing from the scope of the invention.

A. Event Operations

An event operation is a request that the web service perform a data storage task with respect to an event. In one embodiment, each event is represented as a tuple of a User ID, an Event Type, an item (Item ID and Item Type), and the Event Time. Each event is stored in association with the particular web service client that reported the event.

Record Event—This API call requests that an event be recorded by the personalization web service. These events represent end user behavior on the relevant web site 104 and will be used to determine item associations and recommendations. Sending a request for an event that already exists may result in return of a warning. The end user event histories may be stored in an event histories database 300 (FIG. 2B), as discussed in greater detail below. Input parameters may include, but are not limited to, User ID, Item ID, Item Type, Event Type, and Event Time. Output parameters may include, but are not limited to, Is Success, which is a boolean value representing whether or not the Record Event operation was successful.

As discussed below in Section VIII ("Example Use Cases"), this API may be extended by adding one or more parameters for reporting various types of item metadata, such as item subjects and item categories/subcategories. When such an extension is made, the various data request APIs discussed below may be augmented to permit filtering based on the supported types of item metadata. For example, the Get Recommendations APIs may include an input parameter for limiting the recommendations to a particular subject.

Delete Events By Event Type—This API call requests that a set of events be deleted from the histories stored by the personalization web service based on the User ID and Event Type. For example, this API call can be used to clear an end user's 106 viewed items history stored by the personalization web service. Input parameters may include, but are not limited to, User ID and Event Type. Output parameters may include, but are not limited to, Number of Events Deleted, which is an integer value representing the total number of events deleted by the Delete Events By Event Type operation, and Is Success.

Delete Event—This API deletes an event from the histories stored by the personalization web service. The event is identified by the event parameters specified. For instance, this API call can be used if a customer has returned an item. Requesting the deletion of an event that does not exist will return a successful result, as the state of the personalization web service is what the web service client requested. Input parameters include User ID, Item ID, Item Type, Event Type, and Event Time. Output parameters may include, but are not limited to, Is Success and Number of Events Deleted.

Bulk uploads of event data. The web service system 100 may also implement one or more APIs or other mechanisms for reporting multiple events at-a-time. As one example, the system may support the ability for a web service user to upload a file to an FTP (File Transfer Protocol) location associated with the web service. This file may include the event data (e.g., User ID, Event Type, Event Time, Item ID, and Item Type) for each of a plurality of events. As another example, the web service may include an API that enables such a file to be uploaded as part of an API call. As yet another example, the Record Event API described above can be modified to permit a list of events (each including a User ID, Event Type, Event Time, Item ID, and Item Type) to be reported in a single call. As discussed below, a new web service user can use one of these bulk upload methods to efficiently report large quantities of pre-existing event data to the web service.

B. Fetch Operations (Data Requests)

The fetch operations enable web site users to request personalization and history information from the personalization web service 100. The following are examples of the types of fetch operations which may be implemented.

Get Recommendations by User—This API call returns recommendations of a specific Item Type based on a end user's 106 history, and based on item association data generated/maintained by the web service 100 for the associated web site 104. For example, this operation may be called when an end user 106 clicks on a web site link for accessing a web page that is configured to display personalized item recommendations.

In one embodiment, the input parameters are User ID, Item Type, Event Type, and, optionally, Filter List and Max Number. The Event Type parameter enables the requester to request recommendations that are based on a particular type of event, such as purchases or item viewing events. For example, if the API call specifies an Event Type of purchases, the web service 100 uses the end user's purchase history, in combination with the web service user's dataset of purchase-based item associations, to generate personalized item recommendations for the end user 106. If, on the other hand, the API call specifies an Event Type of "views," the web service 100 uses the end user's item viewing history, in combination with the web service user's dataset of view-based item associations, to generate the personalized item recommendations for the end user 106.

The Filter List represents a tuple of Item ID and Item Type identifying items which should be filtered from the items listed in the response. Max Number represents a maximum number of recommended items to return.

The output parameter is or includes Recommended Items, which is a list of the recommended items (ItemID plus ItemType) based upon the input parameters. In some embodiments, the list of recommended items may be accompanied by score values indicating the "strength" of each item recommendation. In one embodiment, the web service filters out (does not return) any items that already appear in the end user's purchase history.

To generate the item recommendations, the recommendation engine 306 initially identifies the items appearing in the relevant event history (e.g., purchase history) of the target user. These items are the sources used to generate the recommendations. If the relevant event history exceeds some size threshold (e.g., one hundred items/events), a selected subset of these items may be used as the sources. The recommendation service then uses an item association dataset of the requesting web site 104 to map the set of source items to a set of additional items to recommend. Items that are associated with more than one of the source items generally have a greater chance of being selected to recommend.

In generating the recommendations, the recommendation engine 306 may give progressively less weight to progressively older events. For instance, if a user purchased item A, then purchased item B six months later, then purchased item C another six months later, the recommendation engine may give the most weight to item C and the least weight to item A. As a result, items associated with item C will generally have a higher chance of being recommended than items associated with item A or item B.

As mentioned above, a given web site 104 may optionally use a single User ID to report the events of multiple users, such as all users who share some attribute or set of attributes. Where such a User ID is supplied as an input parameter for requesting recommendations, the item recommendations will be based on the recorded event history of the entire user group. This may be desirable, e.g., for displaying group recommendations on a web page associated with the group.

Get Recommendations By Items—This API call returns item recommendations based upon an input list of items, and based on item association data generated/maintained by the web service 100 for the associated web site 104. In one example, this operation may be called to obtain recommendations based on the contents of an end user's shopping cart. In this case, the web site would pass a list of the cart items to the web service 100 as the Item List and would received recommendations based on those items. The recommendations may be generated as described in the aforementioned patents.

Input parameters include User ID, Item Type, Event Type, and Item List. Other optional input parameters include Filter List and Max Number. The User ID may be omitted, such as where the end user is unknown to or unrecognized by the web site 104. Output parameters may include, but are not limited to, Recommended Items. In one embodiment, this API filters out (does not return) any items that already appear in the end user's purchase history.

In an alternative embodiment, this API also allows the web site user to supply item weights for the source items (i.e., those on the Item List). Each such weight may be a value on a scale of 0 to 1 which specifies the amount of weight to be given the respective item in generating recommendations. For example, if the input list includes "item A (0.5) and item B (1)," more weight would be given to item B in generating the recommendations.

Get Recommendations by User Plus Items. This API is a hybrid of Get Recommendations by User and Get Recommendations by Items. The input parameters include a User ID, a list of source items, and an optional Item Type. The web service uses the list of source items, in combination with additional items appearing in the specified user's event history (e.g., all purchased items), as sources (inputs to the recommendation engine 306) for generating item recommendations. If an Item Type is specified, the web service only returns those recommended items that match the specified type. Other possible input parameters include Event Type, Filter List, and Max Number, which may be used as described above.

Get Related Items—This API call returns a list of related items for an input or "source" item. This data is based on aggregated end user 104 data provided by the web service client/user. This operation may be called to, e.g., provide a list of related items on an item detail page. In one embodiment, the input parameters are Item ID, Item Type, Event Type, and Max Number, and the output is a list of Related Items. If a particular Event Type is specified, the Related Items list is based on that time of event; for instance, if the Event Type is purchase, a list of items that are commonly purchased in combination with the source item will be returned. In some embodiments, the web service 100 may also return, for each Related Item, a score value indicating the strength of its association with the source item.

Get Conditional Associations—This API enables the web service client to retrieve item associations, and associated conditional probability values, for a specified "source event"/ "target event" pair. In one embodiment, the input parameters are: Item ID, Item Type, Source Event Type, and Target Event Type. The output is a list of items (identified by Item ID plus Item Type), together with associated conditional probability values. In some embodiments, the conditional probability values may be omitted. Optionally, a Target Item Type may be supplied as an input parameter, in which case the output list is filtered to return only items of that type.

For instance, suppose that an API call specifies the following: Item=1234, Source Event Type=view, Target Event Type=purchase. The web service would return: (a) a list of the items that are the most commonly purchased by those who viewed item 1234, and (b) associated conditional probability values representing conditional probabilities that such items will be purchased. In this example, the conditional probabilities are conditional on a purchase being made following the viewing of the source item. A given web site 104 may use this API call to provide the following type of messages on item detail pages: "of those who purchased an item after viewing this item, 2% bought this item, 6% bought item 2345, and 1.5% bought item 3456." The conditional probability values may be generated as described below, and as described in U.S. patent application Ser. No. 10/864,288, referenced above.

The following are examples of other source/target event-type pairs that may be supported: view/rent, view/add-to-cart, search/purchase, search/add-to-cart, search/rent, search/view, search/click-on, purchase/submit-review, download/purchase, comment-on/view. If an API call specifies an invalid source/target event-type pair, the web service 100 may return a runtime error message. Section VIII ("Example Use Cases") below provides some examples of types of content that may be provided to end users via the Get Conditional Associations API.

Get Events—This API call returns a set of events recorded by the personalization web service 100. Input parameters include User ID, Event Type, Item Type, and, optionally, Max Number. The output parameters include Events, which is a list of events corresponding to the input parameters. This API call may, for example, be used for end user 106 navigation aids, and for reminding end users of previous interests. For example, a web site 104 can use this API to retrieve and display a personalized list of recently viewed items, with each such item displayed as or with a link to a corresponding item detail page. The web site 104 can also use this API in combination with Get Recommendations by Items to enable the end user to request recommendations that are based on the set of recently viewed items. In addition, the web site 104 can use the Get Events API in combination with the Delete Events API to enable end users to delete events from their respective event histories, as may be desirable for improving personalized recommendations.

Get Event Type ID—This API call returns an Event Type ID when provided an Event Type.

Get Item Type ID—This API call returns an Item Type ID when provided an Item Type.

Get Most Popular Items—This API call returns the most popular items for a specified Event Type. An Item Type can be specified to limit the type of the items returned. In certain embodiments, a time decay may be utilized in order to bias the popularity by recent sales. Alternatively, a time window may be specified over which most popular items are to be determined.

C. Stoplist Operations

Stoplist operations provide functionality for each web service user to create and manage a persistent stoplist that specifies items that should not be recommended by the web service. Expiration dates may optionally be included for specifying when particular items should be effectively removed from a stoplist. Web service users may use stoplists in various ways. As one example, a stoplist may be created that identifies pre-release items that should not be recommended/displayed until a particular date.

Add Stoplist Item—This API call requests that an item be placed onto the relevant stoplist. This prevents these items from being returned in the responses of the Related Items and Recommendation API calls. Example use cases are to filter items that are out of stock, or to filter adult items which are viewed often but some users may find objectionable. Input parameters may include, but are not limited to, Item ID, Item Type, and, optionally, Reason and Expiration date. Reason is a description of why the item is being added to the stop list. Expiration Date is the date at which the item will be removed from the stoplist. Output parameters may include, but are not limited to, Is Success.

Remove Stoplist Item—This API call requests that an item placed onto the stoplist be removed. Input parameters may include, but are not limited to, Item ID and Item Type. Output parameters may include, but are not limited to, Is Success.

Get Stoplisted Items—This API call returns the items which have been added to the stoplist. This API call can be used for auditing by a web service user. Input parameters may include, but are not limited to, Item Type, Page Size, and Page Number. The Page Size is the number of items returned per request. The Page Size may be set to a default value or adjusted from the default.

IV. Web Service Interface

The requests and responses to the personalization web service may be made using any suitable interface. Examples include, but are not limited to: (a) an interface using Simple Object Access Protocol (SOAP) messages; (b) an interface that uses network-addressable resources (e.g. as a part of the Representational Stat Transfer or REST distributed interaction model); (c) an interface which utilizes Query; and (d) an interface based on the extensible markup language (XML) document sent over hypertext transfer protocol (HTTP) (e.g. using a remote procedure call (RPC) interaction model that focuses on available operations). In some embodiments, multiple mechanisms may be provided for submitting API calls and receiving responses. These mechanisms may describe multiple interfaces and/or network endpoints or other addresses for use with the alternative protocols. Where multiple interfaces are provided, a web service user may select a single interface or a combination of interfaces.

Additional details regarding SOAP may be obtained in "SOAP Version 1.2 Part 1: Messaging Framework, W3C Recommendation 24 Jun. 2003" document, dated Jun. 24, 2003 and available at http://www.w3.org/TR2003/REC-soap12-part1-20030624 and in the SOAP Version 1.2 Part 2: Adjuncts, W3C Recommendation 24 Jun. 2003" document, available at http://www.w3.org/TR/soap12-part2/, each of which is hereby incorporated by reference in its entirety.

Advantageously, the ability to utilize a variety of interfaces provides users of the web service with flexibility to choose the interface or interfaces which are best suited to their situation. For example, web service users may elect to use the interface or combination of interfaces with which they possess the greatest familiarity.

V. Registration Process and Web Site Configuration

Figure 3:
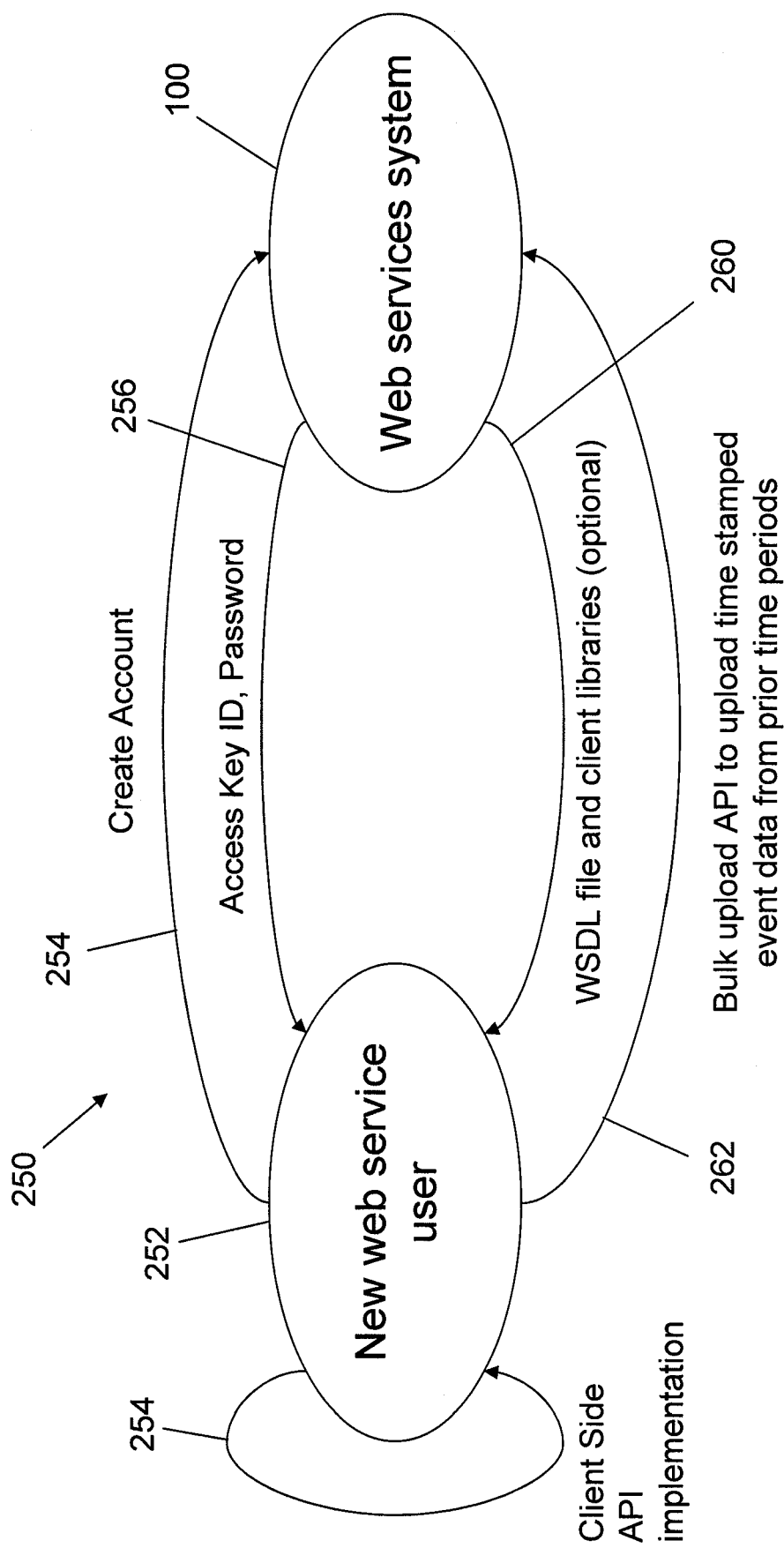
FIG. 3 schematically illustrates an embodiment of a process by which a web site operator may register with, and configure its web site to use, the personalization web service.

Prior to use of the personalization web service 100, a web service user may be required to complete a registration process. FIG. 3 illustrates one embodiment of a method 250 by which a new web service user 252 may register with, and configure its web site to interoperate with, the web service.

In block 254, the web service user 252 creates an account with the system that hosts the web service 100. A web portal or web site may be provided for this purpose. During registration, the web service user 252 provides various types of information such as an email address, a web site URL, an IP address, and payment information. The email address may be used to validate the web site user. The operator of the personalization web service may specify one or more use prices for different types of subscriptions to the web service 100.

In block 256, following account creation, the web services user 252 receives a Web Services Access Key ID and a password from the system 100, such as by accessing a personalized account page. The Web Services Access Key ID and password are used to sign requests for authentication.

In block 260, after registration, the web service user may retrieve a WSDL file which describes the web service's interface. The web services user 252 may then use the WSDL interface description to generate client side code on the web site 104 using well known methods. For example, the web site user may use a commercially available toolkit to generate the client side code from the WSDL file. This client side code implements a client side API implementation 214. Although WSDL is preferably used, it is not required.

The new web service user may also be given access to a client library 216 (shown in FIG. 2A) which includes code for common API calls. In one embodiment, the client library 216 provides a bulk upload interface for at least two of the API calls, Set Stop List and Record Event. Other types of tools, such as a getting started guide, a developer guide, and/or online documentation, may additionally be made available for the personalization web service.

The web service is preferably designed so as to facilitate the upgrade process without hampering existing web service users. In one embodiment, the personalization web service follows WSDL versioning. Specifically, any changes to the request/response of the personalization web service may lead to a new WSDL version. Substantially all WSDL changes may be made in a backwards compatible manner. Whenever a new WSDL file is released, web service users may optionally elect to upgrade their WSDL in order to gain access to new features. However, according to such embodiments, if the web service users choose not to upgrade, they are not required to make any changes.

In block 262 of FIG. 3, the web service user 252 optionally uses the bulk upload API to provide preexisting end user history data (event data) to the web service 100. To perform a bulk upload in one embodiment, the web service user creates and then uploads a file containing event data (User IDs, event types, item IDs and types, and event timestamps) describing previously recorded events. The web service user may generate such a file from its transaction records, access logs, session logs, and/or other saved information regarding end user activities. As discussed above, this capability enables some web service users to immediately supply the web service 100 with sufficient information to generate meaningful item associations.

VI. Authentication of Requests

As discussed above, according to some embodiments, the web service interface 102 authenticates the requests it receives before processing such requests. Although a number of request authentication schemes can be used, in one embodiment, the authentication is performed according to X.509 certificate authentication, as is known in the art. X.509 is an International Telecommunication Standardization Sector (ITU-T) standard for Public Key Infrastructure (PKI) in cryptography. Amongst other things, this standard defines specific formats for Public Key Certificates and the algorithm that verifies a given certificate path is valid under a given PKI (called the certification path validation algorithm). Additional information on X.509 may be found at http://www.itu.int/rec/T-REC-X.509-200508-I.

In one embodiment, the web services user uses its Web Services Access Key ID to sign a string constructed from portions of the request using a keyed-hash message authentication code (HMAC). A time stamp is included in the request and in the string being signed, providing the signatures with a finite lifetime. For enhanced security, the signature is included with the request, not the Web Services Access Key ID. In one embodiment, the authentication component 204 (FIG. 204) verifies the signature before allowing the request 112A to proceed to the recommendation service interface 110.

VII Item Association Mining and Recommendations

Figure 4:
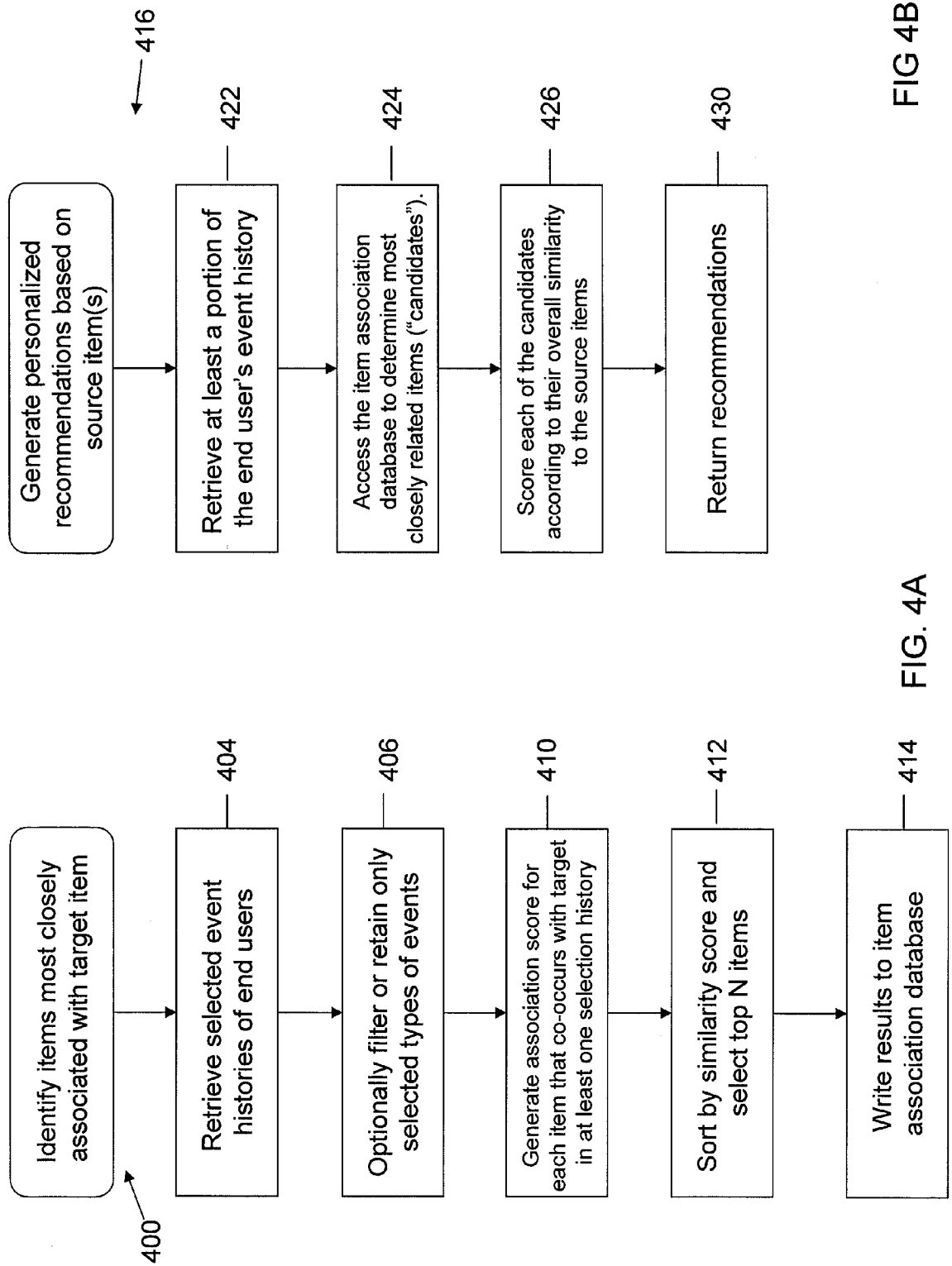
FIG. 4A illustrates one embodiment of a method of identifying item associations using the personalization web service of FIG. 1.
FIG. 4B illustrates one embodiment of a method used by the personalization web service to generate item recommendations.

FIG. 4A illustrates one embodiment of an item association method 400 performed by the association mining component 302 to identify the items most closely associated to a target item for a specific set of events. The association method 400 may be performed for each item for which a sufficient quantity of event data has been collected to reliably detect behavior-based associations between that item and other items. The item association method 400 begins with block 404, where the event histories of a plurality of end users are initially retrieved from the event data repository 300. These event histories may be restricted to a given time period to ensure relevancy, and within a given storage space limitation assigned to the web service user. Subsequently, the histories may be optionally filtered in block 406 so as to retain only a desired type or types of user events, such as views, purchases, searches, etc. Items for which an insufficient quantity of history data exists may also be filtered out.

Next, at block 410, item association scores (also referred to as "similarity scores") are generated for each of the items that co-occur with the target item within at least one event history. Each such score represents a degree of association with the target item. Examples of specific methods that may be used to calculate such scores are provided in the incorporated-by-reference patent references.

As depicted in block 412, the items are then sorted from highest to lowest similarity score. The N items with the highest scores (i.e., those determined to be the most similar to the target item) are selected, and are written to the item association database 304 (block 414) in association with the target item. N may, for example, be in the range of 10 to 25.

The item associations stored in the item association database 304 may be used by a given web site 104 to supplement item detail pages with lists of related items. For example, when an end user 106 requests the detail page for a particular item, a dynamic page generator of the web site 104 may send a "Get Related Items" API call to the personalization web service, providing the Target Item ID, Target Item Type, and Event Type. This request is passed through the web service interface 102 and the recommendation service interface 105 to the item associations database 304, which returns a corresponding list of related items. The recommendation services interface 105 then removes any of these items that appear on the stop list, if any, of the associated web service user or client. The filtered list is then returned to the web site 104 via the web services interface 102, and is incorporated into the requested item detail page.

As discussed above, the item associations are also used for generating personalized recommendations (FIG. 4B) in real time in response to requests (e.g. Get Recommendations and Get Recommendations By Items calls) by the web sites 104. As illustrated by the process 416 shown in FIG. 4B, recommendations for a given user are generated by first retrieving at least a selected portion of the end user's selection history from the event-data storage component 300 (block 422). The item association component 304 is further accessed (block 424) to look up the items ("candidates") that are the most closely related to the source items present in the relevant selection history. In block 426, each such candidate item is scored according to its overall similarity to the source items. The recommendation results are subsequently returned (block 430) to the recommendation services interface 105, which may perform stoplist filtering as described above, and the filtered list is returned to the requesting web site 104. In one illustrative application, the requesting web site transforms the list into names (and possibly images and descriptions) of the recommended items, and incorporates these information into a web page requested by an end user 106.

As discussed above, the association mining component 302 may also generate conditional associations, including conditional probability data. In one embodiment, each conditional probability value indicates or reflects the relative frequency with which end users who performed a first action with respect to a selected item thereafter (within a selected interval) performed a second action. Examples of specific methods that may be used to generate such conditional associations and probability values are described in U.S. patent application Ser. No. 10/864,288, filed on Jul. 9, 2004, the entirety of which is hereby incorporated by reference.

In the discussion below, for clarity, it is assumed that the conditional probability calculated is that of viewing a first item and purchasing a second item. It may be understood, however, that these actions are selected for example purposes and that the actions may comprise any combination of end user actions.

Figure 5:
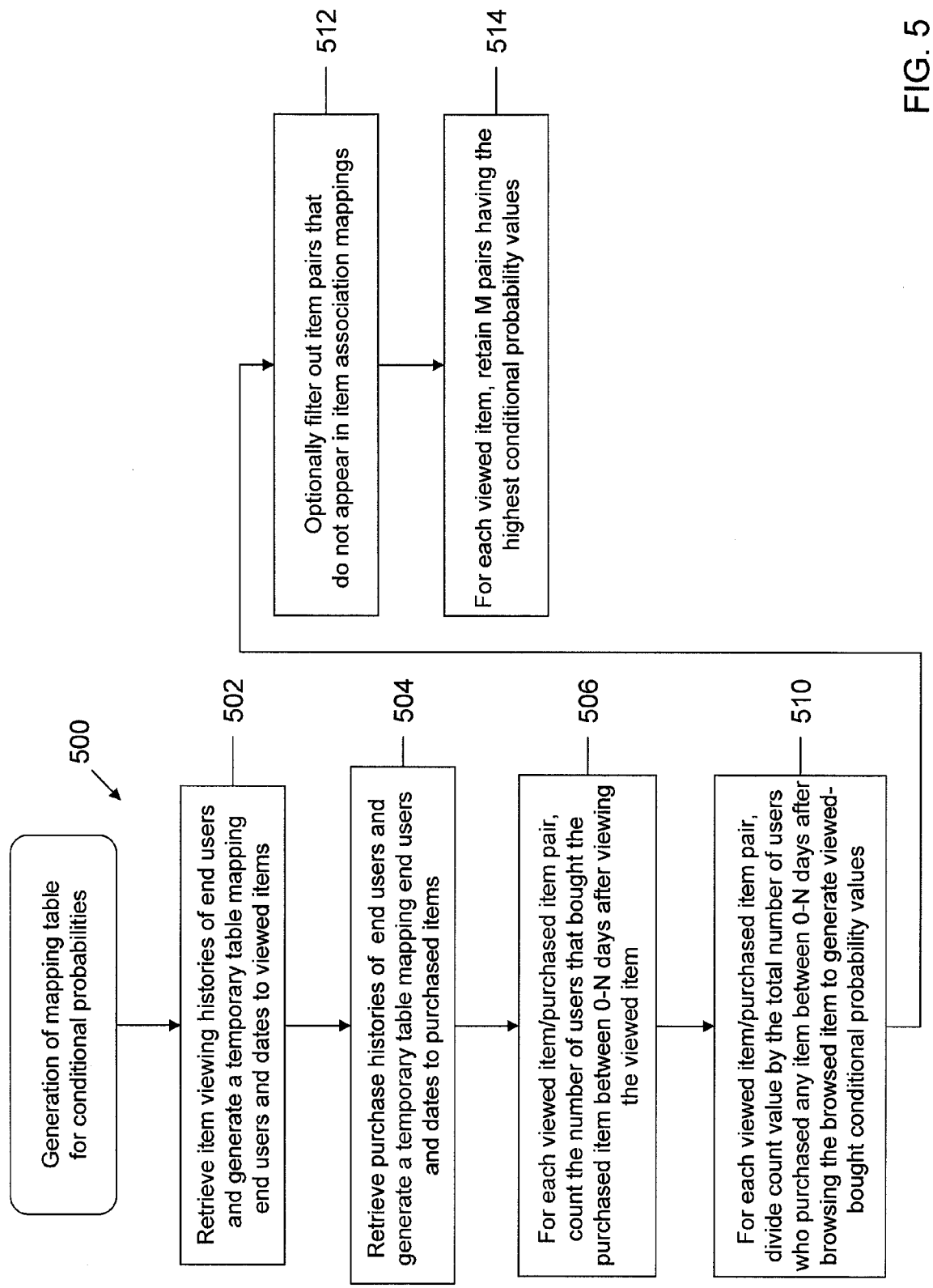
FIG. 5 illustrates one embodiment of a method used by the personalization web service to generate conditional associations between items.

One embodiment of a method 500 for generating a conditional probability mapping table is illustrated in FIG. 5. In block 502, the item viewing histories (which may be session-specific) of all or some subset of the web site's end users 106 are retrieved, and are used to build a temporary table that maps the end user/date information to viewed items. This table indicates, for each end user and each date, what items were viewed by that end user on that date. Where each catalog item has a corresponding detail page, an end user may be treated by the web site 104 as having viewed a target item if and only if the user accessed the target item's detail page. The use or existence of item detail pages, however, is not required.

In block 504 of FIG. 5, the purchase histories of the users are retrieved, and are similarly used to generate a temporary table that maps user/date information to purchased items. As mentioned above, histories of other types of acquisition events (item downloads, rental selections, etc.) may additionally or alternatively be used to build this table. The two temporary tables may, but need not, be limited to a particular date range (e.g., the last three months).

In block 506, the temporary tables are used to count, for each browsed item/purchased item pair, how many users bought the purchased item within 0-N days after viewing the browsed item. (To simplify the analysis, a purchase of the purchased item may be assumed to have occurred after the viewing of the browsed item if both events occurred on the same day.) The value N defines the selected time interval for purposes of calculating the conditional probability values, and may, for example, be a value such as 1, 10 or infinity. Rather than defining the selected time period in terms of days, the time period may, for example, be defined in terms of hours, minutes, or some other unit of time. Although not depicted in FIG. 5, the method 500 may exclude from consideration (a) purchases made outside a browsing session in which the browsed item was viewed, and/or (b) purchases that followed an intervening purchase, as mentioned above. Further, purchases falling outside the top-level item category of the viewed item may optionally be disregarded.

In block 510 of FIG. 5, the count value generated for each browsed item/purchased item pair is divided by the total number of users that purchased any item within 0-N days after viewing the browsed item. The result of this calculation is the corresponding conditional probability value. Thus, for example, assuming that one thousand users made a purchase 0-N days after viewing item A, and that one hundred of those users purchased item B 0-N days after viewing item A, the conditional probability for the pair item A/item B would be $100/1000$, or 10%. As mentioned above, purchases of items falling outside the top-level category of the browsed item may optionally be disregarded for purposes of this calculation. In one embodiment, the denominator may be restricted to sales of the top N purchases.

In block 512, view-purchase item pairs that are not included within the item association mappings discussed above are optionally filtered out of the results set. The effect of this block is to inhibit or prevent the conditional probability listings from including items that are not closely related to the item featured on the detail page.

In block 514, the remaining set of purchased items for a given browsed item are sorted from highest to lowest conditional probability value, and the top M purchased items are retained for inclusion within a data structure such as a conditional mapping table stored within the item association component 304. M may comprise a selected integer, such as five or ten. Thus, for example, although many different items may have been purchased by users who viewed item A, only those M items that were purchased relatively frequently by users who viewed item A are included within the conditional mapping entry for item A.

As mentioned above, the conditional associations for a given item may be retrieved via the Get Conditional Associations API. This API may be used in the same way as described above for Get Related Items, except that the conditional probability values (and associated messaging) may be incorporated into the item detail page as described above.

The conditional probabilities may be used to provide conditional probability data to end users performing a keyword search on the web site. For example, when an end user runs a keyword search for "mp3 player", the search results page may be supplemented with a conditional probability list indicating the frequencies with which users that have purchased a product after searching for "mp3 player" have purchased specific products. To implement this variation, method 500 may be modified to perform the following steps:

analyze user history data reflective of user search activities to identify the most frequently submitted search queries (e.g., the 100,000 most common search queries);

for each such search query, identify a set of end users that submitted the search query and then made a purchase, and for each such set of end users, calculate, for each of a plurality of items purchased by one or more end users in the set after submitting the respective search query, what percentage of the set of end users purchased the respective purchased item.

Some or all of the resulting conditional probability values may be stored in a mapping table that maps search queries (one type of item) to corresponding lists of purchased items. When a user submits a search query, the list of purchased items associated with that search query, including the associated percentage values, may be retrieved from the web service and incorporated into the search results page returned to the end user. Conditional probability lists may be omitted from search results pages where none of the conditional probability values associated with the query exceeds a particular threshold, such as 1%.

The various functions described herein are preferably embodied within computer program code executed by one or more general purpose computers and stored on computer-readable media. More specifically, for example, components 102, 105, 302 and 306 in FIG. 2B may be embodied in computer code executed by one or more computers or computer processors. The various data repositories 300, 304, 310 may be implemented using flat files, databases, and other types of computer storage architecture, with the actual data stored on hard disk drives, solid state memories, and/or any other type of computer storage.

VIII. Example Use Cases

The following examples illustrate how the personalization web service may be used with various types of web sites. These examples are discussed for illustrative purposes and should not be construed to limit the embodiments of the invention.

EXAMPLE 1

Newspaper

The personalization web service 100 may be utilized in conjunction with a newspaper publisher to increase the frequency and duration of customer visits to the newspaper's web site 104. Beneficially, use of the web service may provide the end user with links to additional content of interest on the web site.

The personalization web service may be configured to support the ability to provide recommendations of news articles, including article associations, which are filtered by category. The filtered articles may be further ranked by popularity. In addition, sub-categories which further refine the category of the items may be supported.

By providing recommendations related by subject to current browsing behaviors, the web site 104 may encourage the end user 104 to read more content. Beneficially, as each page contains paid advertisements, the newspaper obtains more revenue with each page the end user selects. Furthermore, as many newspaper web sites charge subscription fees, raising the end user's awareness of additional content of interest may engender loyalty and drive the growth of the subscriber base.

So configured, the personalization web service may provide recommendations in conjunction with the web site 104 of a newspaper which may include, but are not limited to the following. In each of these examples, the message text reveals the type of recommendations provided:

Customers who read this article also read these articles (optionally arranged by category and subcategory). To enable the articles to be arranged by category and subcategory, the Record Event API may be extended to allow item category/subcategory information to be reported as an additional type of item metadata;

Customers who read this whole article (read all the pages) also completely read these articles" (optionally arranged by category and subcategory). The Event Type "CompletelyRead," as well as the item metadata extension mentioned above, may be added to the Report Event API to implement this feature;

Customers who emailed this article also emailed these articles. The Event Type "Emailed" may be added to the Report Event API to implement this feature;

Customers who printed this article also printed these articles. The Event Type "Printed" may be added to the Report Event API to implement this feature;

Customers who saved this article also saved these articles. The Event Type "Saved" may be added to the Report Event API to implement this feature;

Customers who searched using those keywords ultimately read these articles; this feature, and the others listed below that involve two different Event Types (e.g., searched and read), may be implemented using the Get Conditional Associations API described above;

Top articles by category; this feature, and the others listed below involving "top" items, may be implemented using the Get Most Popular Items API described above;

Based on recent views, here are other articles to consider.

EXAMPLE 2

Content Aggregators

Content aggregators are web sites which carry a mixture of different types of content. Examples of such content may include, but are not limited to, customer comments and polls, web logs (blogs), advertisements, journals, and stories. Examples of such web sites may include, but are not limited to, web portals such as Yahoo, Google, Hotmail, and Microsoft Network (MSN). Beneficially, use of the personalization web service 100 may provide the end user with links to additional content of interest on the web site 104.

To adapt to these conditions, the personalization web service may be configured to support several standard and novel parameters and events. The personalization web service, in one embodiment, may be adapted to support events such as "viewed" and "commented on". The web service may further support the categorization of items by Item Subject and Item Type in order to filter the recommendation and association results on these bases. Furthermore, the web service may identify associations and make relationships which are a mixture of event types.

The personalized, recommended content may then encourage the end user to read more content. As each page contains paid advertisements, the content aggregator obtains more revenue with each page the end user selects.

So configured, the personalization web service may provide associations and recommendations in conjunction with the web site of a content aggregator which may include, but are not limited to:

Customers who viewed this story also viewed these stories in that subject; this feature, and the others described below that use item subjects or categories/subcategories, may be implemented by extending the Record Event API to support additional types of item metadata;

Customers who viewed this comment also viewed these comments in that subject;

Customers who viewed this poll also viewed these polls in that subject;

Customers who viewed this journal also viewed these journals in that subject;

Customers who viewed this story also viewed these stories in any subject;

Customers who viewed this comment also viewed these comments in any subject;

Customers who viewed this poll also viewed these polls in any subject;

Customers who viewed this journal also viewed these journals in any subject;

Customers who commented on this story also viewed these stories by subject; this feature, and the next one listed below, may be implemented using the Get Conditional Associations API;

Customers who commented on this story also viewed these stories in any subject;

Customers who commented on this story also commented on these stories by subject;

Customers who commented on this story also commented on these stories in any subject;

Top stories by subject;

Top comments by subject;

Top polls by subject;

Top journals by subject;

Top stories;

Top comments;

Top polls;

Top journals; and

Based on recent views of stories/comments/polls/journals here are some similar stories/comments/polls/journals.

EXAMPLE 3

Redirectors

Redirectors are web sites which handle millions of requests per day for products and redirects searches to various online retailers. They further list millions of products in various categories. Examples include Bizrate.com and Slickdeals. In general, redirectors receive commissions from the various retailers to which they redirect users.

Beneficially, use of the personalization web service may provide end users with links to additional content of interest on the web site 104. In one embodiment, the web service may support "searched for", "viewed", and "clicked through" events. A "searched for" event comprises an item which the end user searches for. A "viewed" event comprises selection of an item from the search results so as to view the item details. These details may include the web sites of vendors which sell the item. A "clicked through" event comprises selection of a vendor's web site from the item detail view.

In one aspect, the personalization web service may improve the quality of search results, allowing the redirector to return not only search results but results which are associated with the item being searched for. As a result, the end user is more likely to find the item being searching for, potentially viewing and clicking through to the vendor's web site. This improvement in "findability" of items is of benefit to the redirector, as redirectors typically receive revenue from views as well as commissions from the vendors for sales.

It is also beneficial for the redirectors to be able to provide controlled substitution of products by one retailer for products by another retailer. Redirectors typically receive varying commissions from various vendors and would benefit from redirecting end users 106 to the vendors which provide the highest commission.

To adapt to these conditions, in one embodiment, the personalization web service 100 may be configured to support several standard and novel parameters and events. To this end, the personalization web service may support a "Vendor ID" parameter for each item, as well as the ability to limit recommendations and associations by category and vendor. When an end user searches for Item A, the personalization web service may determine that Item B is similar to the Item A based upon the searches of other end users. The Vendor ID of the items may be used to further filter the results based upon the vendor with the highest commission. Thus, the redirector may return search results to the end user which maximizes the redirector's commission. This substitution may be performed by the redirector or implemented in the personalization web service.

So configured, the personalization web service may provide associations and recommendations in conjunction with the web site of a redirector which may include, but are not limited to:

Customers who viewed this product in this category (e.g., Electronics) also viewed these products in that category;

Customers who viewed this product also viewed these products in any category;

Customers who viewed this product in this category (e.g., Electronics) by this retailer (e.g., Amazon.com) also viewed these products in that category by that same retailer. This feature may be implemented by obtaining cross-retailer data sharing approval and by using category/subcategory filtering;

Customers who viewed this product by this retailer (e.g., Amazon.com) also viewed these products in any category by that same retailer;

Customers who viewed this product (by category) ultimately clicked on these products (by retailer and popularity);

Popular product by product category;

Popular retailers by product category;

Based on your recent views here are some similar products (by category);

Customers who searched for your keywords (by category) ultimately clicked on these products (by retailer and popularity);

Customers who searched for your keywords (by category) ultimately viewed these listings (by retailer and popularity).

EXAMPLE 4

Redirectors

In another example, redirectors may offer Internet deals and coupons. The volume of offers makes it difficult for customers to find the popular and/or correct offer, however. As redirectors are paid for page views and receive commissions on sales, it is of benefit for the redirectors to be able to provide listings of the most popular items so as to improve the length of time end users are on the web site 104, as well as the number of pages they view.

To adapt to these conditions, in one embodiment, the personalization web service may be configured to support several standard and novel parameters and events. The personalization web service may be tailored to support "Searched For", "Viewed" and "Clicked Through" events, as well as an "Offering Site ID" for the items. The ability to limit recommendations and associations by category and offering site are also important.

So configured, the personalization web service may provide associations and recommendations in conjunction with the web site of a redirector which may include, but are not limited to:

Top deals by category;

Top deals;

Customers who searched using those keywords in this category viewed these deals in that category (by offering site and popularity);

Customers who searched using those keywords in this category clicked on these deals in that category (by offering site and popularity);

Based on recent clicks here are other deals to consider by category and offering site.

EXAMPLE 5

Social Networking Sites

Social networking sites have been characterized as the online version of the "town square." End users come to social networking sites to meet friends, conduct conversations, gain information, and buy and sell items, among other activities. Examples include MySpace and Craigslist. Typically, social networking sites are paid for posting advertisements of items for sale and available jobs. Finding these types of advertisements amongst the large volume of advertisements is problematic, however. This difficulty is compounded by the fact that postings are quickly outdated by the submission of newer advertisements.

Recommendations, associations, and top listings are one way in which the visibility of popular items might be increased. Further, end users may be assisted in finding listings related to their searches. Given the rich diversity of advertisements on social networking sites, sophisticated personalization capabilities are desirable.

To adapt to these conditions, in one embodiment, the personalization web service may be configured to specify a customer segment in addition to a User ID. The items may be further specified by identifying items by both an item area (location) as well as an Item ID. To facilitate networking contacts, the web service 100 may further support both "viewed" as well as "contacted" events. The "contacted" event represents whether the seller/vendor of an item has been previously contacted. The personalization web service may also support limiting its recommendations by area and category. The personalization web service may be adapted to provide results by RSS and e-mail, allowing the web service to engage end users through whatever communication mechanism they prefer, enhancing the end user's experience.

So configured, the personalization web service 100 may provide recommendations in conjunction with social networking web sites which may include, but are not limited to, the following:

Customers in your area (e.g., Seattle) who viewed in this category (e.g., Cars for sale) also viewed these listings in that category;

Customers in your area (e.g., Seattle) who viewed this listing also viewed these listings in any category;

Customers in your area (e.g., Seattle) who viewed in this category (e.g., Cars for sale) also contacted these listings in that category;

Customers in your area (e.g., Seattle) who viewed this listing also contacted these listings in any category;

Popular listings by area and category. This feature, and the others mentioned below involving "popular" items, may be implemented using the Get Most Popular Items API;

Popular listings by area in any category;

Popular listings anywhere in any category;

Based on your recent views here are some similar listings (by area and category);

Customers who searched for your keywords (by area and category) ultimately viewed these listings.

The web service 100 may also include functions for assisting users in locating other users they may like (e.g., "other customers who viewed XYZ's profile also viewed ABC's profile," or "based on your browse history and those of other users, you may be interested in contacting the following users . . . ").

EXAMPLE 6

Blogs

In general, blogs are user-generated web sites or pages where entries are made in journal style and displayed in a reverse chronological order. Typically, blogs blend some combination of text, images, and links to other blogs, web pages, and other media related to its topic. Additionally, readers of the blog often leave comments in an interactive format. Unfortunately, due to the chronological nature of the postings, most blog entries become difficult to locate in the repeated posts of a heavy blogger.

The personalization web service 100 may be utilized to increase the visibility of popular articles. In one embodiment, the web service may support top entries viewed. This allows the most popular entries to all visitors to the blog (end users).

Furthermore, a threshold for events may be selected, where events below the threshold are not considered statistically significant for recommendations. This feature helps to ensure that only events (e.g. page views) of a certain frequency or absolute number are considered in the recommendations.

The personalization web service may also support limits on recommendations and similarities by subject area (e.g. Microsoft). This subject limitation is particularly well suited to blogs, which often follow a "thread" or subject. As a result, end users may quickly find threads of interest, rather than trudging through many uninteresting posts.

So configured, the personalization web service may provide associations and recommendations in conjunction with blogs which may include, but are not limited to, the following:

Popular listings anywhere in any category. Those articles which are the most popular (e.g. top ten) may be provided as a recommendation to all visitors. This association may keep the high-visibility entries right on the main page.

Customers who viewed this blog entry also viewed these blog entries. This association may allow for alternate navigation through blog entries based on popular visitor behavior.

Advantageously, the recommendations provided by the personalization web service increase the usefulness of the blog by providing recommendations based upon popularity. This improved navigation improves the ease of use of the blog, potentially resulting in longer browsing sessions, which in turn generates greater advertisement serving and increases the site revenue of the blog.

EXAMPLE 7

Search Engines

Search engines are widely used web sites which catalog internet content, allowing searches to be performed on various topics. The quality of the searching may be improved through use of the personalization web service 100.

In one embodiment, the personalization web service may be adapted to provide "Searched For" and "Clicked On" events. The Searched For event indicates that a search has been performed on the item, while the Clicked On event indicates that an item link was selected by the searcher. The Searched For and Clicked On events may also be linked together in certain embodiments. In this fashion, relationships may be determined between items that are searched for and items that are clicked on. Beneficially, the positive action of clicking on a link indicates that there is a high likelihood of association between the two.

So configured, the personalization web service may provide recommendations in conjunction with search engines which may include, but are not limited to, the following:

Similar searches—Customers who searched for these keywords also searched for . . .

Popular hits—Customers who searched for these keywords most commonly chose . . .

EXAMPLE 8

Cross Site Personalization

Large companies often own more than one Internet property. For example, one company may own a web site about movies, a movie studio, a sports web site, an Internet portal, and a news web site. Personalization of the customer experience between the Internet properties may be accomplished through use of the personalization web service.

In one aspect, the personalization service receives history data from the different Internet properties. With this information, associations may be made between items on the web sites, despite their origin from different web sites 104. In certain embodiments, a "URL" parameter may be added to each item, allowing recommendations and associations to be filtered by web site.

Advantageously, by providing recommendations across different web sites, end users are exposed to items from throughout the owned web site. As the recommendations and associations are drawn from a larger content pool than might be available for a single web site, the likelihood of returning recommendations and associations of interest to the end user are increased. Thus, while an end user might move from web site to web site within the network of owned web sites, they remain within the network.

So configured, the personalization web service may provide recommendations in conjunction with networks of web sites. These recommendations may include, but are not limited to, the following:

Customers who viewed this movie also viewed these TV shows (and vice versa);

Customers who viewed this article also viewed these articles/movies/shows;

Recommendations for other sites based on recent views.

VIII. CONCLUSION

Although this invention has been described in terms of certain preferred embodiments and applications, other embodiments and applications that are apparent to those of ordinary skill in the art, including embodiments and applications that do not provide all of the benefits described herein, are also within the scope of this invention. The scope of the invention is defined only by the claims, which are intended to be construed without reliance on any definitions that may be implicitly or explicitly included in the incorporated-by-reference materials.

What is claimed is:

1. A computer-implemented method of providing a service to a plurality of sites that provide interactive user access to electronic data repositories of items, the method comprising:

receiving and recording event data reported by each of the sites, said event data describing item-specific events generated by users of said sites, wherein the event data for an event includes at least an item identifier of an item that is the subject of the event, an item type identifier specifying a type of the item, a user identifier of a user that generated the event, and an event type identifier specifying a type of the event, said event data reported via an event reporting Application Program Interface (API) of said service;

implementing an event retrieval API that enables each site to request and retrieve the recorded event data associated with the respective site by at least user identifier, item type identifier, and event type identifier;

implementing at least one recommendations API that enables each site to request and obtain item recommendations that are based on the recorded event data, said at least one recommendations API enabling the sites to limit the requests for item recommendations to particular users, item types, and event types;

receiving, via the recommendations API, a request from a requesting site for item recommendations, said request specifying one or more limiting parameters, said one or more limiting parameters including at least one of: a user identifier, an event type identifier, and an item type identifier; and obtaining a recommended items list to provide to the requesting site in response to the request for item recommendations, said recommended items list determined from the recorded event data and limited based on the one or more limiting parameters;

said method performed by execution of service code by a computer system that comprises one or more computers.

2. The method of claim 1, further comprising, by said computer system, implementing an event deletion API that enables each site to request deletion of recorded event data by at least user identifier and item identifier.

3. The method of claim 1, further comprising, by said computer system, implementing an API that enables each site to specify an event type, and to obtain a list of the most popular items corresponding to the specified event type as determined from the recorded event data.

4. The method of claim 1, further comprising, by said computer system, implementing at least one API that enables each site to define a persistent stoplist that identifies, for the respective site, a set of items to be excluded from item recommendations provided by the service, wherein the computer system uses the stoplists to filter item recommendations provided to the respective sites.

5. The method of claim 1, further comprising, by said computer system, implementing an API that enables each site to retrieve from the service, for a designated source item and event type, a list of items that are related to the source item.

6. The method of claim 1, further comprising, by said computer system, implementing an API that enables each site to specify a source event type and a target event type that is different from the source event type, and to obtain conditional item-association data corresponding to said source event type and target event type, said conditional item-association data derived from the recorded event data of the specified source and target event types.

7. The method of claim 1, wherein the computer system implements at least one of the following item types: browse node, person, review.

8. The method of claim 1, wherein the computer system implements an item type of search query, to thereby enable the sites to record search query submission events and to obtain recommendations of search queries.

9. The method of claim 8, wherein the computer system further implements an event type of search query submission.

10. The method of claim 1, wherein the computer system implements, via said event type identifier, an event type of submitting a comment on an item, to thereby enable the sites to record events in which users submit comments on particular items.

11. The method of claim 1, wherein each item is uniquely identified for a given site by a combination of an item identifier and item type identifier, such that a given item identifier can be re-used across item types to identify different items.

12. The method of claim 1, wherein at least some of the item identifiers included in the recorded event data are generated using a transformation function that conceals the actual item identifiers used by the corresponding sites from the service, whereby user privacy is preserved.

13. The method of claim 1, wherein the method comprises generating, for each site, a respective item-association dataset that is based solely on the event data reported by the respective site, and using the item-association datasets to generate said item recommendations.

14. A computer system for providing a service to a plurality of sites that provide user access to electronic repositories of items, said computer system comprising one or more computers, and being programmed to at least:

receive and record event data reported by each of the sites, said event data describing item-specific events generated by users of said sites, wherein the event data for an event includes at least an item identifier of an item that is the subject of the event, an item type identifier specifying a type of the item, a user identifier of a user that generated the event, and an event type identifier specifying a type of the event, said event data reported via an event reporting application program interface (API);

implement an event retrieval API that enables each site to request and retrieve the recorded event data associated with the respective site by at least user identifier, item type identifier, and event type identifier;

implement at least one recommendations API that enables each site to request and obtain item recommendations that are based on the recorded event data, said at least one recommendations API enabling the sites to limit the requests for item recommendations by specifying particular users, item types, and event types;

receive, via a recommendations API, a request from a requesting site for item recommendations, said request specifying one or more limiting parameters, said one or more limiting parameters including at least one of: a user identifier, an event type identifier, and an item type identifier; and obtain a recommended items list to provide to the requesting site in response to the request for item recommendations, said recommended items list determined from the recorded event data and limited based on the one or more limiting parameters.

15. The computer system of claim 14, wherein the computer system is further programmed to implement an event deletion API that enables each site to request deletion of recorded event data by at least user identifier and item identifier.

16. The computer system of claim 14, wherein the computer system is further programmed to implement an API that enables each site to specify an event type, and to obtain a list of the most popular items corresponding to the specified event type as determined from the recorded event data.

17. The computer system of claim 14, wherein the computer system is further programmed to implement at least one API that enables each site to define a persistent stoplist that identifies, for the respective site, a set of items to be excluded from item recommendations provided by the service, wherein the computer system uses the stoplists to filter item recommendations provided to the respective sites.

18. The computer system of claim 14, wherein the computer system is further programmed to implement an API that enables each site to retrieve from the service, for a designated source item and event type, a list of items that are related to the designated source item.

19. The computer system of claim 14, wherein the computer system is further programmed to implement an API that enables each site to specify a source event type and a target event type that is different from the source event type, and to obtain conditional association data corresponding to said source event type and target event type, said conditional association data derived from the recorded event data.

20. The computer system of claim 14, wherein the computer system is programmed to implement at least one of the following item types: browse node, person, review.

21. The computer system of claim 14, wherein the computer system is programmed to implement an item type of search query, to thereby enable the sites to record search query submission events and to obtain recommendations of search queries.

22. The computer system of claim 21, wherein the computer system is programmed to implement an event type of search query submission.

23. The computer system of claim 14, wherein the computer system is programmed to implement an event type of submitting a comment on an item, to thereby enable the sites to record events in which users submit comments on particular items.

24. The computer system of claim 14, wherein each item is uniquely identified for a given site by a combination of an item identifier and item type identifier, such that a given item identifier can be re-used across item types to identify different items.

25. The computer system of claim 14, further comprising a client component that transforms actual item identifiers used by the sites to a format that conceals the actual item identifiers from the service.

26. The computer system of claim 14, wherein the computer system is programmed to generate, for each site, a respective item-association dataset that is based solely on the event data reported by the respective site, and is programmed to use the item-association datasets to generate the item recommendations.

* * * * *